United States Patent [19]
French

[11] 3,930,527
[45] Jan. 6, 1976

[54] TIRE AND WHEEL ASSEMBLY
[75] Inventor: Tom French, Sutton Coldfield, England
[73] Assignee: Dunlop Holdings Limited, London, England
[22] Filed: Sept. 20, 1973
[21] Appl. No.: 399,249

Related U.S. Application Data
[63] Continuation of Ser. No. 150,628, June 7, 1971, abandoned.

[30] Foreign Application Priority Data
June 20, 1970 United Kingdom............ 30029/70

[52] U.S. Cl....... 152/330 RF; 152/158; 152/330 L; 152/352; 152/362 CS; 152/379 S; 152/405
[51] Int. Cl.²............... B60B 21/02; B60B 21/10; B60B 25/20; B60C 5/00
[58] Field of Search ......... 152/158, 178, 352, 353, 152/354, 355, 362 CS, 362 R, 378, 379, 381, 152/384, 386, 396, 398, 404, 411, 415, 427, 152/330 RF, 378 R, 379 R, 405, 330 L, 152/330 PP, 379 S

[56] References Cited
UNITED STATES PATENTS

| | | | |
|---|---|---|---|
| 1,921,772 | 8/1933 | Paull | 152/379 X |
| 2,521,305 | 9/1950 | Olson | 152/355 |
| 2,675,846 | 4/1954 | Wyman | 152/362 R X |
| 2,822,019 | 2/1958 | Koch et al. | 152/362 R |
| 2,879,824 | 3/1959 | Koch | 152/362 R |
| 2,929,432 | 3/1960 | Komimic et al. | 152/415 |
| 3,299,934 | 1/1967 | Pace | 152/354 |
| 3,329,192 | 7/1967 | Rogue | 152/384 X |
| 3,392,772 | 7/1968 | Powers | 152/158 |
| 3,610,310 | 10/1971 | Wittneben | 152/352 |
| 3,669,174 | 6/1972 | Mills | 152/386 |
| 3,708,847 | 1/1973 | Mitchell | 152/379 R X |
| 3,739,829 | 6/1973 | Powell et al. | 152/330 RF |

FOREIGN PATENTS OR APPLICATIONS

| | | | |
|---|---|---|---|
| 222,768 | 10/1924 | United Kingdom | 152/398 |
| 245,393 | 1/1926 | United Kingdom | 152/411 |
| 412,293 | 6/1934 | United Kingdom | 152/378 |
| 640,327 | 7/1950 | United Kingdom | 152/427 |
| 943,664 | 10/1948 | France | 152/404 |
| 950,266 | 3/1949 | France | 152/396 |
| 968,317 | 9/1964 | United Kingdom | 152/381 |
| 1,184,116 | 3/1970 | United Kingdom | 152/379 |
| 1,209,443 | 10/1970 | United Kingdom | 152/362 CS |
| 1,216,276 | 11/1959 | France | 152/362 CS |
| 1,587,833 | 2/1970 | France | 152/362 R |

Primary Examiner—M. Henson Wood, Jr.
Assistant Examiner—Howard Beltran
Attorney, Agent, or Firm—Stevens, Davis, Miller & Mosher

[57] ABSTRACT

A wheel having a pair of spaced-apart seats for tire beads and annular, axially extending rim portions extending from adjacent the bead seats and forming faces against which a sidewall of a tire can be deflected and supported when the tire is deflated.

8 Claims, 4 Drawing Figures

TIRE AND WHEEL ASSEMBLY

This application is a continuation of copending application Ser. No. 150,628, filed June 7, 1971, now abandoned.

When a pneumatic tire is punctured, loss of air can occur to the extent that opposite interior walls of the tire come into contact with high localized pressure caused by the vehicle load passing through the radially outward edges of the radial flanges of the wheel rim.

Physical damage is caused to the tire by the high localized pressure and considerable heat is generated by the rubbing action between the interior walls of the tire, the coefficient of friction of dry rubber upon dry rubber being high. The damage and heat generation can rapidly cause tire failure. Moreover, relative slippage between tire beads and the bead seats on the wheel rim can occur causing damage and further heat generation.

According to the present invention there is provided a wheel having a rim with a pair of spaced-apart seats for the reception of tire beads, annular, substantially axially-outwardly-extending rim portions of the wheel being provided one adjacent to each bead-seat and forming faces against which a sidewall of a tire can be deflected and supported.

The pair of annular, substantially axially-extending rim portions of the wheel may be of such a width that the wheel rim has an overall width between opposite extremities not greater than, and it can be substantially equal to, the overall width of the tread of a tire fitted to or to be fitted to the wheel. The spacing of the bead seats, which governs the width of each individual axially-extending rim portion, is such as to provide a tire beadspacing resulting in a tire having substantial stability against laterally-applied forces.

An example of the bead-seat spacing for a wheel of overall section width 6 inches is 3.5 inches.

Each of the annular rim portions to sidewall support may be provided on its supporting surface with a coating of a low friction material e.g. polytetrafluoroethylene or the rim may be polished to reduce heat generation and abrasion when the lower sidewall region of the tire, which is of greater diameter than the annular rim portions, is collapsed on said portions of the rim.

In addition, lower regions of the tire sidewalls may be similarly treated or a low friction rubber compound may be used in the tire sidewall e.g. a rubber compound including a poly-butadiene or natural rubber. The rubber of at least the lower sidewall region is preferably highly abrasion resistant.

The invention includes a wheel rim and tire assembly, the tire having a sidewall constructed in accordance with the preceding paragraph.

The rim may be provided with a portion between the bead seats which projects radially outwards thereof to form a saddle upon which the interior surface of the tread portion of a tire can be supported upon partial or complete tire deflation.

Preferably the wheel rim is a flat-base rim i.e. a rim having no well into which the tire beads are able to fall. If desired the wheel rim may be provided with movable studs or projections which prevent at least the laterally outer bead of a tire mounted on the rim from moving away from its seat.

The wheel rim may, if desired, be an axially compressed ("crimped") rim, or may be a rim which is split to facilitate mounting and removal of a tire.

The present invention may be used in conjunction with our U.S. patent application Ser. Nos. 154,326, filed June 18, 1971, now U.S. Pat. No. 3,739,829, 150,558, now abandoned in favor of continuation application Ser. No. 443,530 of Feb. 19, 1974, 150,627, 150,562 (now abandoned), 150,561 (now abandoned), 150,564, now U.S. Pat. No. 3,814,161, all filed June 7, 1971.

The invention applies to tire and wheel assemblies in which the tire can be removed from the rim or alternatively when the tire is not removable therefrom, the two forming a permanent assembly, for example, when the rim is swaged over the tire beads after assembly of the tire and rim.

Figure 1:
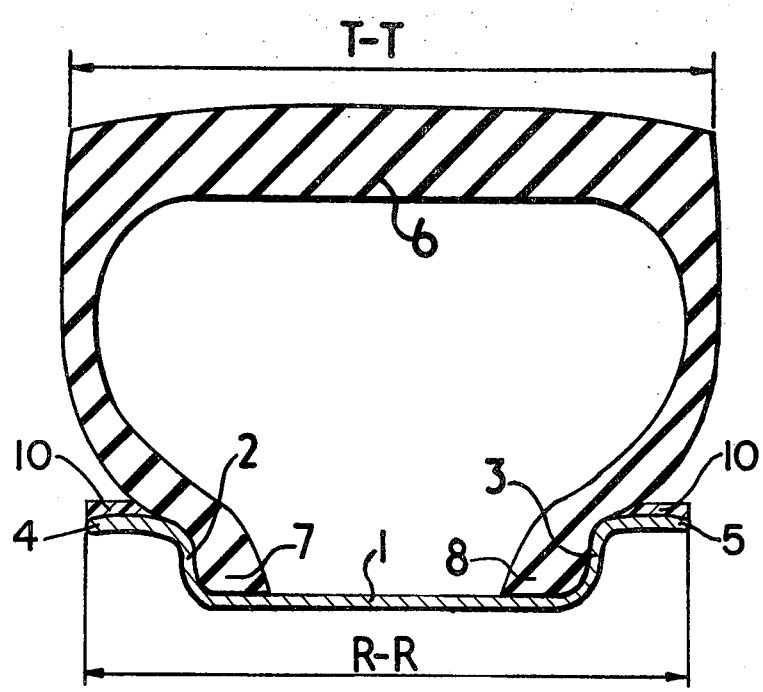
FIG. 1 is a sectional view through the wheel of this invention showing a tire mounted thereon.
Figure 2:
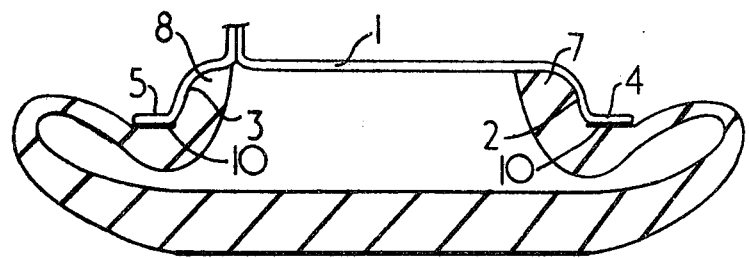
FIG. 2 is a view similar to FIG. 1 but showing the tire in a deflated condition.

The wheel rim consists of a substantially flat base 1 shown schematically in FIG. 1 since the rim would preferably be split or have an axially compressed portion in order to facilitate mounting of the tire. This is done in the case of an axially compressed rim by axially compressing and thus closing up a well in the rim after mounting the tire thereon.

The rim base 1 is provided with flanges 2 and 3 which have axially outwardly extending annular portions 4 and 5 extending therefrom.

A tire 6 is mounted on the rim with its beads 7 and 8 seated against the flanges 2 and 3 the width T—T of the tread of the tire being greater than the overall width R—R of wheel rim.

It should be noted that for a tire with a given tread width the proportion of the width of the rim base 1 to the width of the annular rim portions 4 and 5 is chosen to retain satisfactory lateral stability of the tire while providing a broad support surface for the collapsed sidewalls.

Figure 3:
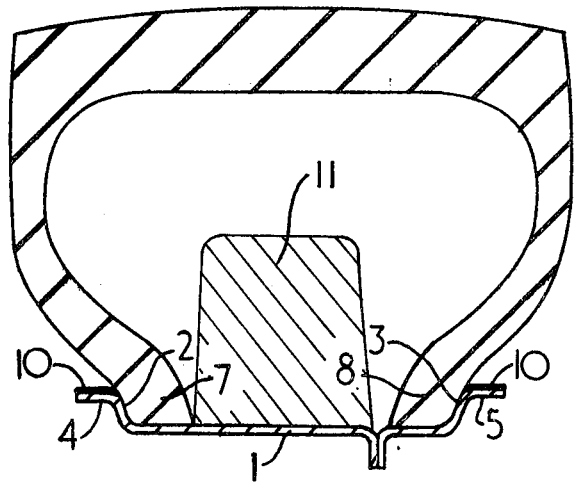
FIG. 3 is a view similar to FIG. 1 showing a saddle projecting from the wheel into the interior of the tire and an axially compressed or split rim on the wheel.

Preferably a low friction coating 10 e.g. polytetrafluoroethylene is provided on the radially outer surface of the annular portions 4 and 5. The rim may be provided with a portion between the bead seats which projects radially outwards thereof to form a saddle 11 (FIG. 3) upon which the interior surface of the tread portion of a tire can be supported upon partial or complete deflation.

Figure 4:
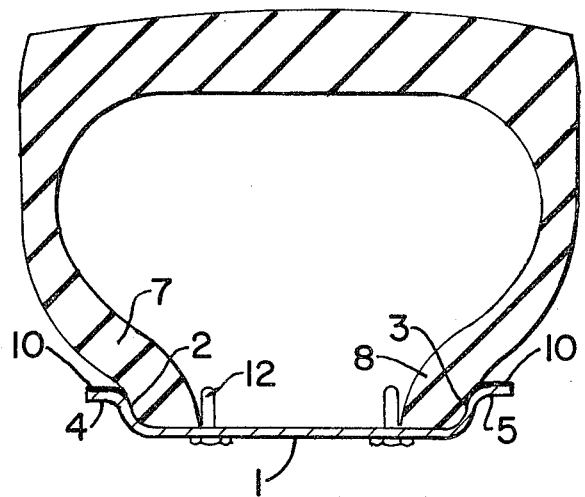
FIG. 4 is a view similar to FIG. 1 showing movable studs or projections on the wheel rim extending radially outwardly to prevent the beads of the tire from moving away from their seats.

If desired the wheel rim may be provided with movable studs or projections 12 (FIG. 4) which prevent at least the laterally outer bead of a tire mounted on the rim from moving away from its seat.

Having now described my invention what I claim is:

1. A wheel for a single chamber pneumatic tire capable of being run in a deflated condition comprising a wheel rim having a pair of spaced apart seats for receiving the tire beads and a pair of annular flanges for preventing axial outward movement of the tire beads when the tire is inflated, each flange having a circumferentially extending substantially axially outwardly projecting portion defining a surface against which the sidewall of a tire can be supported when the tire is run deflated, each axially outwardly projecting portion having on its sidewall supporting surface a coating of a low friction material.

2. A wheel according to claim 1 in which the low friction material is polytetrafluoroethylene.

3. The wheel of claim 1 including a tire having a tread width greater than the overall width between extremities of the wheel rim.

4. The wheel of claim 1 further including means between the spaced apart bead seats to prevent a bead of a tire mounted thereon from becoming dislodged from its bead seat when running in a deflated condition.

5. A wheel according to claim 4 in which the means for preventing a bead of a tire mounted thereon from becoming dislodged when running in a deflated condition comprises a portion on the wheel between the spaced apart seats projecting radially outwards thereof to form a saddle on which the interior surface of the tread of a tire mounted on the rim can be supported upon deflation.

6. A wheel according to claim 4 in which the means for preventing a bead of a tire mounted thereon from becoming dislodged when running in a deflated condition comprises movable projections on the wheel rim extending radially outwardly to prevent at least the laterally outer bead of the tire from moving away from its seat.

7. A wheel according to claim 4 in which the means for preventing a bead of a tire mounted thereon from becoming dislodged when running in a deflated condition comprises a nondecreasing diameter of the wheel rim between the flanges.

8. A wheel according to claim 7 in which the wheel rim is split to permit a tire to be mounted thereon.

* * * * *